UNITED STATES PATENT OFFICE.

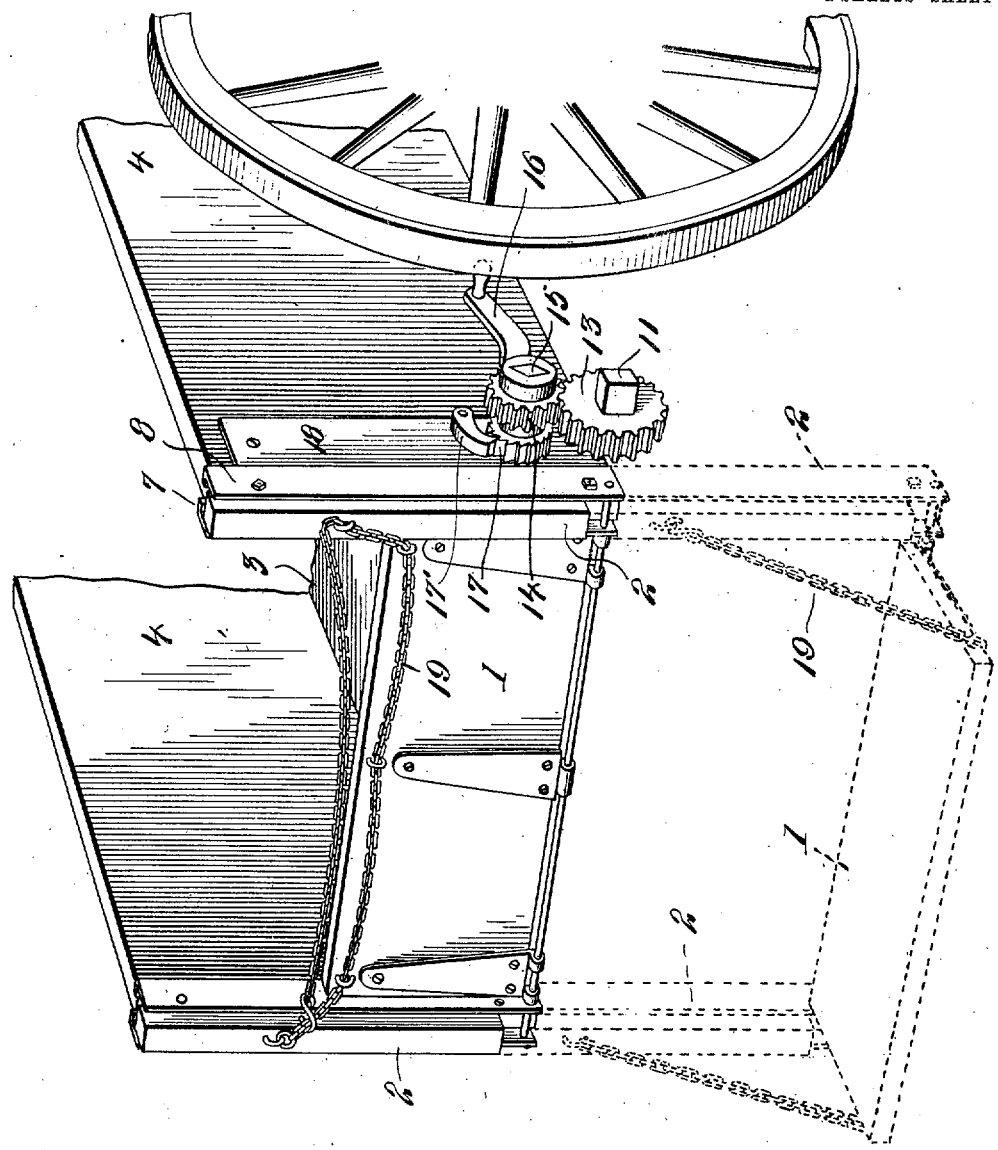

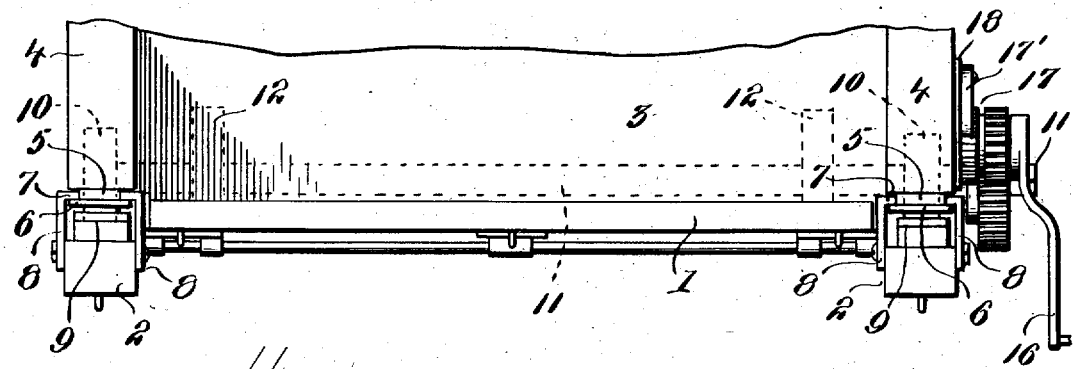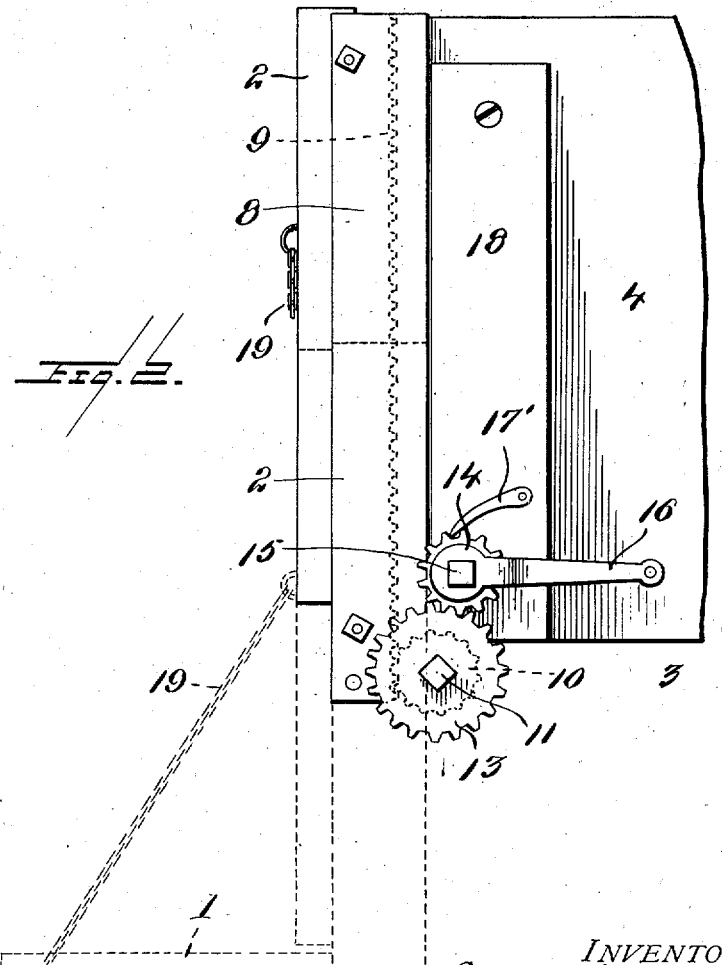

LAURISTON G. McGRANOR AND JOHN W. BEALL, OF IRWIN, PENNSYLVANIA.

ELEVATING-WAGON.

No. 874,525.  Specification of Letters Patent.  Patented Dec. 24, 1907.

Application filed July 24, 1907. Serial No. 385,338.

*To all whom it may concern:*

Be it known that we, LAURISTON G. Mc-GRANOR, and JOHN W. BEALL, citizens of the United States, residing at Irwin, in the county of Westmoreland and State of Pennsylvania, have invented a new and useful Improvement in Elevating-Wagons, of which the following is a specification.

This invention relates to end gates for vehicles, and has for its object to provide a vehicle with an end gate, by means of which the end gate may be used as a platform and elevated or lowered for loading and unloading, thereby facilitating the handling of heavy goods, in an economical manner.

The invention consists of an apparatus located at the rear end of the body of a vehicle and connected with the end gate whereby the latter may be lowered from the body of the vehicle to the ground, goods placed thereon, and the end gate raised to the body of the vehicle, the end gate serving as an elevator to lift goods to the body of the wagon and to lower them when discharging the load, all as herein set forth and illustrated.

Referring to the accompanying drawings illustrating my invention, Figure 1 is a view in elevation of the rear of a vehicle body, showing the invention applied thereto. Fig. 2 is a side view, and, Fig. 3 is a plan view.

In carrying out this invention, the end gate 1 of a vehicle is hinged to the lower end of two vertically movable uprights 2, which may be connected in any suitable manner to the rear ends of the sides of a vehicle body 3, so as to ride up and down thereon, and a suitable mechanism may be employed to lower and raise said uprights carrying the end gate from the vehicle body to the ground.

To set forth the construction and manner of operating this apparatus, at the rear end of the sides 4 of the vehicle body 3 are mounted vertical strips 5, provided with flanges 6, which are engaged by the flanges 7 of the angle irons 8, secured to the uprights 2, and serving to hold them in place in their vertical movement.

The inner faces of the uprights 2 are provided with vertical racks 9, which engage pinions 10, rigidly carried on a shaft 11, which is mounted in bearings 12 on the bottom of the wagon body 3. A pinion 13 on one end of the shaft 11 engages a gear wheel 14 on a shaft 15, mounted in the side 4 of the body 3.

The shaft 15 is provided with a crank arm 16 and with a ratchet 17, engaged by a pawl 17' on the side of the body 3, which at this point is preferably provided with a reinforcing metallic plate 18 to strengthen same. The end gate 2 is held in open and closed position by the usual chains and staples 19, or other suitable means.

By the foregoing means, the end gate 1 may be lowered from the body of the vehicle to the ground, loaded with the freight to be placed in the vehicle, and raised to the level of the body of the vehicle, where the goods may readily be moved into place.

It will readily be seen that by means of this invention, the lifting of heavy merchandise into the vehicle is greatly facilitated, as well as shortening the time of loading and unloading.

The construction and operation of our invention will be readily understood by reference to the foregoing description and the accompanying drawings, and it will be appreciated that the parts and combinations may be varied within a wide range without departing from the spirit and scope of our invention.

Having thus described our invention, what we claim as new and desire to be secured by Letters Patent is:

1. The combination with a vehicle, of an end gate carried upon vertically movable uprights, racks carried on said uprights, pinions rigidly carried on a transverse shaft engaging said racks, and means for operating said shaft for lowering and raising said end gate, substantially as described.

2. The combination with a vehicle, of an end gate carried upon vertical uprights movably carried upon the rear ends of the sides of the vehicle, racks carried upon said uprights, pinions engaging said racks rigidly carried on a transverse shaft, a crank arm geared to said transverse shaft for operating same for lowering and raising the end gate, substantially as described.

In testimony whereof, we have hereunto signed our names in the presence of two subscribing witnesses.

LAURISTON G. McGRANOR.
JNO. W. BEALL.

Witnesses:
O. B. SHAFF,
THOMAS MILES.